United States Patent Office 3,655,811
Patented Apr. 11, 1972

---

3,655,811
OLEFIN POLYMERIZATION PROCESS
Jin Sun Yoo, Riverdale, Ill., assignor to Atlantic
Richfield Company
No Drawing. Filed July 15, 1968, Ser. No. 744,665
Int. Cl. C07c 3/10
U.S. Cl. 260—683.15 D                      19 Claims

ABSTRACT OF THE DISCLOSURE

A catalyst composition consisting essentially of:
(A) An actinide series metal compound, e.g., thorium nitrate tetrahydrate,
(B) A reducing agent, e.g., ethylaluminum sesquichloride,
(C) A non-protonic Lewis acid, e.g., ethylaluminum sesquichloride, and, as optional, preferred ingredients,
(D) A trihydrocarbylphosphine, e.g., triphenylphosphine, and
(E) An inert, organic solvent, e.g., chlorobenzene, is disclosed as being useful for catalyzing the polymerization of olefins or phenyl-substituted olefins to normally liquid polymers or oligomers, e.g., for catalyzing the dimerization of propylene.

---

The present invention relates to a novel catalyst composition and to the use of such catalyst in the polymerization or oligomerization of olefins and phenyl-substituted olefins to low molecular weight polymers or oligmers. More particularly, the invention relates to an actinide series metal-containing catalyst system, e.g., thorium-containing, especially useful in catalyzing the dimerization of propylene.

Numerous catalyst systems have been disclosed in the prior art as being suitable for the preparation of polymers of olefins such as alpha-mono-olefins and conjugated diolefins, particularly to form low molecular weight dimers, trimers, tetramers, etc. of such oelfins. Normally gaseous olefins such as propylene have, for example, been effectively dimerized using these catalyst systems to produce hexene fractions of varying composition. The polymeric and oligomeric products produced in such reactions are often valuable in either the petrochemical field or the fuel industry or both. One of the major fractions of dimeric propylenes, 2-methylpentenes, can be utilized, for instance, for the synthesis of isoprene. Another propylene dimerization product, 2,3-dimethylbutene, is useful as a feed for the production of 2,3-dimethylbutadiene which in turn can be used in a multi-step synthesis of pyromellitic anhydride, or can be hydrogenated to yield 2,3-dimethylbutane, useful as an octane-enhancing ingredient in gasoline. The latter compound, for example, has the highest research octane number (103.5) of those paraffins having boiling points up to 140° F.

It has now been found that a catalyst composition containing a metal of the actinide series is extremely active in catalyzing the polymerization or oligomerization of such olefins to normally liquid polymers or oligomers, e.g., dimers, trimers, tetramers, etc. The catalyst composition of the present invention comprises a combination of (A) an actinide series metal compound, (B) a reducing agent, (C) a non-protonic Lewis acid and, as an optional ingredient, (D) a trihydrocarbylphosphine. As will be discussed hereinafter, ingredients (B) and (C) can both be supplied by a single component which performs both reducing agent and Lewis acid functions. Preferably there will also be included in the catalyst composition an inert organic solvent in amounts up to about 99 percent, preferably about 80 or 90 to 95 percent, based on the combined weight of (A), (B), (C), (D) and said solvent, i.e. based on the weight of the total catalyst composition.

The actinide series metal compound, component A of the catalyst composition, may be supplied by various actinide series metal compounds, including actinide series metal salts of mineral acids, actinide series metal salts of carboxylic acids of at least 4 carbon atoms and actinide series metal complexes. As examples of suitable mineral acid salts may be mentioned the actinide series metal nitrates, cyanides, halides (especially the chlorides and bromides), etc. The carboxylic acids whose actinide series metal salts can be employed as component A in the composition will generally have at least 4 carbon atoms and can have as high as about 30 or more carbon atoms. Included among the suitable acids are poly-, e.g. di-, carboxylic acids as well as monocarboxylic acids, and aromatic as well as aliphatic (including cycloaliphatic) carboxylic acids. Ethylenically-unsaturated as well as saturated carboxylic acid salts can be employed also. Thus there can be used, for example, salts of the folowing acids: phenylacetic, phenylpropionic, caproic, palmitic, stearic, vinylacetic, undecenoic, crotonic, adipic, decane-1,10-dicarboxylic, muconic, cyclohexane carboxylic, cyclohexane dicarboxylic, benzoic, naphthoic, phthalic, isophthalic, terephthalic, dimethoxyacetic, dimethoxypropionic, dimethoxyacrylic, dimethoxymonochloroacetic, dimethoxybenzoic, dimethoxymalonic, dimethoxyadipic, etc. The hydrocarbon carboxylic acids are often preferred, and among the fatty acids those of 4 to 7 carbon atoms are often preferred.

It is freqently advantageous to employ as component A of the composition an actinide series metal complex, preferably one wherein the electron donor portion is a weak field ligand. The term "complex" is here used synonymously with coordination compound and is intended to embrace complexes with monodentate complexing agents, i.e. those agents which contain only one electron donor group, as well as complexes with polydentate complexing agents, i.e. those agents, usually organic, which contain two or more electron donor groups. The latter complexes, known as "chelates," are often preferred over monodentate complexes for use in the catalyst composition of the present invention. There may advantageously be employed those complexing agents wherein the electron donor atoms are selected from the non-metallic elements of Groups V–A and VI–A of the Periodic Table, e.g., O, N, S, As, Bi and P. As suitable oxygen-containing complexing agents there may be mentioned, for instance, carbonyl, hydroxyl and carboxylate group containing compounds, and often preferred are, for example, the beta-diketones, the beta-hydroxyaldehydes, the beta-ketocarboxylic acid esters, the dialkoxy-carboxylic acid esters, etc. As suitable nitrogen-containing complexing agents may be mentioned, for instance, primary, secondary and tertiary amino group containing compounds as well as oximes, imines and imides. As examples of suitable sulfur-containing complexing agents there may be mentioned the thioalcohols, thioketones, thioethers, etc. And as suitable phosphorus-containing complexing agents there may be mentioned, for instance, the phosphines. The oxygen-containing complexes may advantageously be selected for use in the catalyst composition of the present invention, and as specific examples of such may be mentioned: acetylacetonates, propionylacetonates, benzoylacetonates, complexes with salicylaldehyde, etc.

Often preferred as the actinide series metal are thorium and uranium, which may be supplied, for instance, as either thorium (IV), uranium (III, IV) or uranyl compounds.

The reducing agent, component B, is supplied by a compound which is compatible with component C, the Lewis acid, and which is capable of reducing the actinide series metal in the actinide series metal compound to a lower oxidation state, preferably to less than 1 and even to zero. The reducing agent should not, however, be effective to reduce the metal to its elemental state.

The Lewis acid, component C, is supplied by a compound which is other than a protonic, or hydrogen, acid and which is capable of receiving one or more pairs of electrons to form a coordinate covalent bond. Lewis acids are well known to the art and are fully defined, for example, by Nolher, "Chemistry of Organic Compounds," W. B. Sanders Company, 1951, at pages 233–235; by Stone, Chemical Review, vol. 58, 1958, at page 101; and by their namesake, G. N. Lewis, Journal of the Franklin Institute, 226, 293 (1938).

As mentioned above, both B and C may be supplied by a single compound which performs both functions. As examples of such a compound may be mentioned the acidic organometal halides which correspond to the general formula $$R'_{(n-y)}MX_y$$

wherein M is a metallic element of coordination number $n$ whose halides are Lewis acids, X is halogen having an atomic number of 9 to 53 (i.e., fluorine, chlorine, bromine or iodine), R' is hydrocarbyl, e.g. alkyl, of 2 to about 20, preferably 2 to about 6, carbon atoms and $y$ is a number having a value from greater than 0 to less than $n$, often having a value from 1 to $n-1$. Often preferred metallic elements in the above compound include aluminum, zinc and tin. As examples of suitable such acidic organometal halides may be mentioned the alkylaluminum halides, including mono-, sesqui- and dihalides, and as specific example of suitable alkylaluminum halides may be mentioned diethylaluminum chloride, iodide and bromide; ethyl aluminum dichloride, diiodide and dibromide; and ethylaluminum sesquichloride, sesquiiodide and sesquibromide.

When, however, the particular reducing agent employed in the composition does not also perform as a Lewis acid, it is necessary to separately supply the Lewis acid to the catalyst composition. Examples of reducing agents which are suitable as component B in the composition but which do not perform satisfactorily as Lewis acids therein include trialkylaluminums, monoalkoxydialkylaluminums, and dialkylaluminum hydrides wherein the alkyl and alkoxy groups contain up to about 6 carbon atoms; Grignard reagents; allyl and alkyl tin complexes; and compounds of the formula M'AlR'''₄ and M'BeR'''₃ wherein M' is an alkali metal, e.g., sodium, lithium or potassium, and R''' is alkyl, for example of 2 to 6 carbon atoms.

And, correspondingly, as examples of suitable Lewis acids which do not perform as reducing agents in the system may be mentioned aluminum chloride, zinc chloride, stannic chloride, boron trifluoride, boron trifluoride etherates, e.g., the diethyl etherate, etc.

The trihydrocarbylphosphine component, optional ingredient (D) of the catalyst of the present invention, can be supplied by a compound corresponding to the general formula R₃P wherein R is a hydrocarbon radical of 1 to about 12 carbon atoms. Preferably, R is selected from the group consisting of alkyl, aryl, alkaryl and aralkyl radicals and is devoid of olefinic or acetylenic unsaturation; different R's may, of course, be present in the same phosphine molecule. When the phosphine component contains aromatic groups it is generally preferred that these have mono-cyclic structures, i.e., that the groups be selected from phenyl, alkylphenyl, or phenylalkyl radicals.

The presence of the phosphine component, which apparently can enter into a complex-forming reaction with the actinide series metal compound, makes for a more active catalyst composition. As examples of suitable phosphines may be mentioned triphenylphosphine, trimethylphosphine, tricyclohexylphosphine, tri-n-hexylphosphine, tri-n-decylphosphine, tribenzylphosphine, tri-(4-n-butylphenyl)phosphine, phenyldialkylphosphines and the like.

The molar ratio of component B (reducing agent) to component A (actinide) compound in the catalyst composition is about 3 to 40:1, preferably about 5 to 30:1. (For reasons of economics, however, it may often be preferable to employ no more than about 12 moles of component B per mole of component A.) Similarly, the molar ratio of component C (Lewis acid) to component A (actinide compound) is also about 3 to 40:1, preferably about 5 to 30:1. (Again, for economic reasons it may be preferable to employ no more than about 12 moles of component C per mole of component A.)

Where optional component D (phosphine) is included in the composition it can generally be present in amounts up to about 10 moles or more per mole of component A, and will often be present in amounts of about 3 to 9 moles per mole of said component A. (Economic considerations, however, may dictate that no more than about 5 moles of phosphine be employed per mole of component A.)

The trihydrocarbylphosphine component, if employed, may advantageously be pre-mixed with the actinide series metal compound and the reducing agent and Lewis acid added to the resultant mixture. Depending upon the pre-admixing temperature and the particule actinide series metal compound and phosphine employed, it is believed that the actinide compound and the trihydrocarbylphosphine may react together, for instance in a certain molar ratio, to form a complex. It is further thought that some of the phosphine, when brought into contact with the remaining components of the catalyst composition, i.e. Components B and C, might also enter into a complex-forming reaction with those components as well. Accordingly, there may be present in the catalyst composition amounts of trihydrocarbylphosphine in excess of that, if any, which is complexed with the actinide series metal compound. Where, for example, an acidic organometal halide or a trialkylaluminum is employed in the composition it is preferred that there be an evcess of trihydrocarbylphosphine present, i.e. in addition to that which is complexed with the actinide series metal compound, this excess apparently complexing with a portion of the acidic organometal halide or trialkylaluminum. The system with a phosphine ligand usually forms a more stable and active catalyst.

As indicated above, the preparation of the preferred catalyst composition, i.e. that wherein component D is included, is preferably conducted by first admixing the trihydrocarbylphosphine with the actinide series metal compound in the presence of a suitable organic solvent and then adding to the resultant solution or suspension the reducing agent (component B) and the Lewis acid (component C). The pre-admixing of components A and D may be conducted at room temperature or lower, or as high as about 300° F. The use of elevated temperatures, say about 120° F. or higher, and often from about 120 to 200° F., is believed to be more conducive to the formation of a complex between the actinide compound and the phosphine compound than are room temperatures or lower. It is often desirable to wait a short period of time after pre-admixing components A and D, say about 5 to 30 minutes, before adding components B and C to the pre-admixture.

Where component D is omitted from the catalyst composition, no advantage is known to reside in the use of any particular mixing sequence and the composition can be formulated by simply admixing components A, B and C in a suitable organic solvent.

Suitable solvents for the admixing procedures described above include the same solvents as those which are suitable for use in the final catalyst composition. If desired, however, where components A and D are pre-admixed, such pre-admixing may be accomplished in a solvent which is unsuitable for use in the final catalyst composition; in this case the pre-admixing solvent should then be removed from the solution or suspension and the residue redissolved or re-suspended in a proper solvent which is inert to the final catalyst composition.

Suitable organic solvents for the final catalyst composition are those which are inert to the catalyst and which will not enter into, or deleteriously affect, the eventual polymerization or oligomerization reaction. As specific examples thereof may be mentioned aromatic and paraffinic hydrocarbons and their halogenated, e.g. chlorinated, derivatives such as, for instance, chlorobenzene. Oxygen-containing solvents are generally to be avoided for this purpose.

The combining of the catalyst components is preferably conducted in a dry, inert atmosphere, out of the presence of air, for instance in an autoclave. Within a relatively short period of time after the admixing of all the components, e.g. about 5 to 15 minutes, an active catalyst composition is formed which may be used to catalyze the polymerization or oligomerization reaction.

The catalyst composition of the present invention may be used to catalyze the production of liquid polymers or oligomers of olefins of 2 to 6, or even 8, carbon atoms, as well as monophenyl- or diphenyl- derivatives thereof. By the terms "polymerization" and "polymer" it is meant to include herein copolymerization and copolymers as well as homopolymerization and homopolymers, and oligomerization and oligomers, e.g. dimerization and dimers, trimerization and trimers, etc., as well as cross- or co-oligomerization, e.g., cross- or co-dimerization, etc. For example, by cross-dimerization, used herein as being synonymous with co-dimerization, is meant the addition reaction combining one mole of a first olefin, for instance, propylene, with one mole of a second olefin, for instance, butene, to form one mole of a cross-dimer, for instance heptane. By dimerization, on the other hand, is meant the addition reaction which simply combines two moles of a single olefin, for instance propylene, to form the respective dimer, for instance hexene. Polymerization and polymers are the terms here used to embrace all of these reaction and reaction products.

Thus, suitable feeds include, for instance, monoethylenically unsaturated olefins, preferably alpha-olefins, such as ethylene, propylene and isobutene; poly-ethylenically unsaturated olefins, preferably the dienes, such as butadiene-1,3; and phenyl-substituted derivatives of the foregoing olefins, such as styrene, 1,4-diphenylbutadiene-1,3 and 1-phenylbutadiene-1,3. The polymers produced by the action of the present catalyst composition will often be of 2 to about 4 monomer units per molecule, i.e., will often range from dimers to tetramers. The catalyst composition has been found, for example, to be especially suitable for the production of hexene fractions by the dimerization of propylene.

Polymerization can be effected by contacting the olefinically-unsaturated feed at generally elevated temperatures, say about 50 or 90 to 300° F., preferably about 90 to 125° F., and at atmospheric, elevated or reduced pressures. Suitable pressures include about 0 or 150 to 1000 p.s.i.g., preferably about 150 to 350 p.s.i.g. The amount of catalyst composition used in the reaction is that sufficient to effect polymerization of the feed and often is about 0.1 to 1% of catalyst composition (not including the solvent therefor) based on the weight of hydrocarbon feed.

The invention will be better understood by reference to the following examples. Unless otherwise indicated, percentages are by weight.

EXAMPLE I

A 300 cc. stainless steel autoclave was used as a reactor. Thorium nitrate tetrahydrate ($Th(NO_3)_4 \cdot 4H_2O$) (0.61 mmole) and 5.31 mmoles of triphenylphosphine ($\phi_3P$) were weighed into the reactor with 50 g. of chlorobenzene. While the reactor was purged with nitrogen, these components were vigorously agitated at 120° F. for about 30 minutes. The reactor was partially evacuated to introduce a chlorobenzene solution of ethylaluminum sesquichloride ($Et_3Al_2Cl_3$) (23.0 mmoles) by suction through a syringe needle. A small amount (10 ml.) of fresh solvent was drawn into the reactor to clear the residue of $Et_3Al_2Cl_3$ solution retained in the syringe needle. The total amount of chlorobenzene introduced into the reactor was 95 g. Propylene (220 ml.) was continuously fed into the reactor at pressures of 150–500 p.s.i.g. and temperature of 115–120° F. for 2 hours. A rapid pressure drop (about 10–8 p.s.i.g./min.) persisted during this reaction period, thus indicating that the reaction rate was rapid. The drop in pressure was determined by intermittently shutting off the incoming propylene stream and then observing the indicated change in pressure within the autoclave.

Reaction was discontinued by discharging the light yellow reaction (liquid) mixture with a small amount of yellow precipitate into a cold flask. The catalyst composition in the reaction mixture was destroyed with dilute hydrochloric acid. The organic layer was separated from the milky aqueous portion and distilled into fractions. One hundred and eight (108) grams of propylene (2600 mmoles) was observed to have been dimerized to hexene products using 0.6 mmole of catalyst composition (based on thorium content) within 3 hours. The products were identified by means of gas chromatographic and hydrogenation techniques. Tables I–III list details of the reaction conditions, catalyst compositions, and product distributions.

EXAMPLE II

In another run, both 0.66 mmoles of $Th(NO_3)_4 \cdot 4H_2O$ and 2.70 mmoles of $\phi_3P$ were charged simultaneously into 40 g. of chlorobenzene in the autoclave. Stirring was continued for twenty minutes. Immediately after a chlorobenzene solution of $Et_3Al_2Cl_3$ (9.1 mmoles) was introduced into the reactor, propylene was fed at 350–500 p.s.i.g. The pressure of the system was maintained at 500 p.s.i.g. by supplying fresh propylene continuously throughout the reaction period (2½ hours). The rapid pressure drop (10–5 p.s.i.g./minute) was continuously observed until the reaction was discontinued. The total amount of propylene fed was 245 ml., and the temperature of the reactor was maintained at 115–120° F. In this run, 79 g. of reacted propylene was recovered with 61% yield of dimer during 2½ hour reaction period.

Comparing Examples I and II, it is noted that the higher molar ratios of $\phi_3P$ to $Th(NO_3)_4 \cdot 4H_2O$ and $Et_3Al_2Cl_3$ to $Th(NO_3)_4 \cdot 4H_2O$ which were employed in Example I resulted in greater catalyst activity as measured by the extent of conversion of the propylene feed. The distribution of products was substantially the same for both examples however; see Tables I–III below.

EXAMPLE III

In this run the catalyst was prepared by adding 0.82 mmole $Th(NO_3)_4 \cdot 4H_2O$, 6.70 mmoles $\phi_3P$ and 17.5 mmoles $Et_3Al_2Cl_3$ to 65 g. chlorobenzene. Addition of propylene was immediately started after addition of all the catalyst components was complete. The exothermicity of the reaction raised the temperature of the reactor, but heating was required from time to time to maintain the temperature of the reaction at 115–125° F. for 3 hours. One hundred and twenty-five (125) grams of reacted propylene was recovered as mostly hexenes (96%) and $C_8$–$C_9$ olefins (4%) in a very high yield (98%). The pressure was 350–500 p.s.i.g. over the 3 hour period. The conditions and results obtained in this run are tabulated in Tables I–III.

EXAMPLE IV

According to the previous procedures, 0.90 mmole $Th(NO_3)_4 \cdot 4H_2O$ and 4.68 m. moles $\phi_3P$ were weighed into 60 g. chlorobenzene in the reactor. After the reactor was purged with nitrogen for about 15 minutes, a 25% toluene solution of Et₃Al₂Cl₃ (23.0 mmoles) was introduced into the system, and propylene was fed immediately after these three components were mixed. About 235 ml. of propylene was fed into the reactor within 40 minutes. Exothermicity of the reaction raised the temperature to 140° F. without heating and the pressure of the system was 750 p.s.i.g. At this stage a very rapid pressure drop (80–90 p.s.i.g. per min.) was observed. Another 15 ml. of fresh propylene was fed to maintain the pressure of the system at 750 p.s.i.g. for an additional 25 minutes. Feeding was discontinued, and the system was allowed to react for another 15 minutes before the reaction was stopped. The pressure dropped to 140 p.s.i.g. at the final stage of the reaction. Within a 2 hour period, 126 g. of reacted propylene was obtained, representing a 96% yield. The conditions employed and the results obtained in the present run are also described in Tables I–III.

TABLE I.—CATALYST COMPOSITIONS AND REACTION CONDITIONS

| | Catalytic composition $\varphi_3$ | | | | Reaction conditions | | |
|---|---|---|---|---|---|---|---|
| | Th(NO₃)₄·4H₂O (mmole) | $\varphi^3$P (mmole) | Et₃Al₂Cl₃ (mmole) | Solvent (g.) | Pressure (p.s.i.g.) | Temp. (° F.) | Time (hrs.) |
| Example No. | | | | | | | |
| I | 0.61 | 5.31 | 23.0 | ¹ 95 | 150–500 | 115–120 | 3 |
| II | 0.66 | 2.70 | 9.1 | ¹ 79 | 350–500 | 115–120 | 2½ |
| III | 0.82 | 6.70 | 17.5 | ¹ 65 | 350–500 | 115–125 | 3 |
| IV | 0.90 | 4.68 | 23.0 | ² 77 | 750 | 140 | 2 |

¹ Chlorobenzene only.
² A mixed solvent of chlorobenzene and toluene.

TABLE II

| Example number | I | II | III | IV |
|---|---|---|---|---|
| Weight of recovered product, grams | 108 | 79 | 125 | 126 |
| Weight percent yield of product, based on amount of propylene reactant | 94 | 61 | 98 | 96 |
| Distribution of product, wt. percent | | | | |
| Components, wt. percent of total products: | | | | |
| 4-methylpentene-1 and 3-methylpentene-1 | 0.85 | 2.68 | 1.54 | 1.20 |
| cis-4-methylpentene-2 | 4.53 | 10.61 | 6.21 | 4.87 |
| 2,3-dimethylbutene-1 and trans-4-methylpentene-2 | 30.45 | 30.96 | 33.38 | 27.37 |
| Hexene-1 and 2-methylpentene-1 | 14.10 | 15.79 | 14.08 | 12.29 |
| Trans-hexene-3 | 4.75 | 3.75 | 4.42 | 4.02 |
| Cis-hexene-3 | 0.33 | 1.50 | 0.60 | 0.68 |
| Trans-hexene-2 | 15.11 | 13.84 | 14.05 | 13.34 |
| 2-methylpentene-2 | 20.13 | 8.96 | 17.67 | 16.90 |
| Cis-hexene-2 and cis-3-methylpentene-2 | 3.76 | 4.04 | 3.91 | 3.60 |
| 2,3-dimethylbutene-2 | 0.53 | | 0.33 | 0.51 |
| C₈ and C₉ olefins | 5.99 | 7.89 | 3.82 | 15.23 |

TABLE III.—HYDROGENATION STUDY OF THE IPB TO 100° C. FRACTION

| Example number | Iᵃ | IIᵇ | IIIᶜ | IVᵈ |
|---|---|---|---|---|
| Component in hydrogenated product, wt. percent: | | | | |
| 2,3-dimethylbutane and 2-methylpentane | 73.23 | 73.20 | 76.04 | 74.83 |
| n-Hexane | 24.44 | 21.35 | 22.97 | 24.78 |
| C₈–C₉ paraffins | | 5.19 | 1.01 | 0.15 |
| Unknown | 1.62 | 0.25 | | |

ᵃ Fraction represents 81% of total product.
ᵇ Fraction represents 78% of total product.
ᶜ Fraction represents 85% of total product.
ᵈ Fraction represents 85% of total product.

It is claimed:

1. A process for polymerizing an olefinic hydrocarbon of 2 to about 8 carbon atoms and mixtures thereof which comprises polymerizing said olefinic hydrocarbon and mixtures thereof in contact with a catalyst comprising
   (A) an actinide series metal compound selected from the group consisting of
      (i) actinide series metal salts of mineral acids,
      (ii) actinide series metal salts of carboxylic acids having at least 4 carbon atoms and
      (iii) actinide series metal complexes;
   (B) a reducing agent which is capable of reducing the actinide series metal in (A) to a lower oxidation state but not to the elemental metal;
   (C) a non-protonic Lewis acid; and
   (D) a complex forming amount of a trihydrocarbyl phosphine, the molar ratio of (B) to (A) being about 3 to 40:1, the molar ratio of (C) to (A) being about 3 to 40:1, and the said components (B) and (C) being combined with (A) to reduce the actinide series metal (A) to a lower oxidation state and the molar ratio of (D) to (A) being up to about 10:1.

2. A process of claim 1 wherein the reducing agent (B) is selected from the group consisting of trialkylaluminums, monoalkoxydialkylaluminums, and dialkylaluminum hydrides, wherein the alkyl and alkoxy groups have up to about 6 carbon atoms; Grignard reagents; allyl and alkyl tin complexes; and compounds of the formula MAlR₄ and MBeR₃ wherein M is an alkali metal and R is alkyl of 2 to 6 carbon atoms, and the Lewis acid (C) is selected from the group consisting of aluminum chloride, zinc chloride, stannic chloride, boron trifluoride and boron trifluoride etherates.

3. A process of claim 2 wherein (D) is a trihydrocarbyl phosphine of the formula $$R''_3P$$

wherein R'' is a hydrocarbon radical of 1 to about 12 carbon atoms.

4. A process of claim 3 wherein each R'' is selected from alkyl, aryl, alkaryl and aralkyl, (A) is selected from thorium and uranium and the polymerization is conducted in the presence of an inert solvent.

5. A process of claim 1 wherein (B) and (C) are each selected from a reducing agent and non-protonic Lewis acid having the formula $$R'_{(n-y)}M'X_y$$

wherein M' is a metallic element of coordination number n whose halides are Lewis acids, X is halogen having an atomic number of 9 to 53, R' is hydrocarbyl of 2 to about 20 carbon atoms, y is a number having a value from greater than 0 to less than n, and the molar ratio of (B) plus (C) to (A) is from 3 to about 40:1.

6. A process of claim 5 wherein M' is selected from the group consisting of aluminum, zinc and tin.

7. A process of claim 6 wherein M' is aluminum.

8. A process of claim 5 wherein R' has from 2 to about 6 carbon atoms and X is selected from chloride and bromide.

9. A process of claim 8 wherein M' is aluminum and X is chloride.

10. A process of claim 9 wherein the molar ratio of (B) plus (C) to (A) is from 5 to 30:1 and the olefinic hydrocarbon is propylene.

11. A process of claim 10 wherein (D) is a trihydrocarbyl phosphine of the formula $$R''_3P$$

wherein R'' is a hydrocarbon radical of 1 to about 12 carbon atoms and the polymerization process is conducted in the presence of an inert solvent, and the molar ratio of (D) to (A) is from about 3 to 9:1.

12. A process of claim 11 wherein each R'' is selected from alkyl, aryl, alkaryl and aralkyl and (A) is selected from thorium and uranium.

13. A process of claim 8 wherein the molar ratio of (B) plus (C) to (A) is from 5 to 30:1 and the olefinic hydrocarbon is selected from ethylene, propylene and styrene.

14. A process of claim 8 wherein (D) is a trihydrocarbyl phosphine of the formula $$R''_3P$$

wherein R" is a hydrocarbon radical of 1 to about 12 carbon atoms, the molar ratio of (D) to (A) is from about 3 to 9:1, and the polymerization process is conducted in the presence of an inert solvent.

15. A process of claim 14 wherein each R" is selected from alkyl, aryl, alkaryl and aralkyl, (A) is selected from thorium and uranium and the olefinic hydrocarbon is selected from ethylene, propylene and styrene.

16. A process of claim 15 wherein the olefinic hydrocarbon is propylene.

17. A process of claim 1 wherein (D) is a trihydrocarbyl phosphine of the formula $$R''_3P$$

wherein R" is a hydrocarbon radical of 1 to about 12 carbon atoms.

18. A process of claim 17 wherein each R" is selected from alkyl, aryl, alkaryl and aralkyl, (A) is selected from thorium and uranium and the polymerization is conducted in the presence of an inert solvent.

19. A process of claim 18 wherein the olefinic hydrocarbon is propylene.

References Cited
UNITED STATES PATENTS

| | | | |
|---|---|---|---|
| 3,113,115 | 12/1963 | Ziegler et al. | 252—429 |
| 3,114,743 | 12/1963 | Horne | 252—429 X |
| 3,341,619 | 9/1967 | Stogryn et al. | 260—683.15 |

PAUL M. COUGHLAN, Jr, Primary Examiner

U.S. Cl. X.R.

252—429 B, 431 P